United States Patent
Dain et al.

(10) Patent No.: US 10,346,253 B2
(45) Date of Patent: *Jul. 9, 2019

(54) THRESHOLD BASED INCREMENTAL FLASHCOPY BACKUP OF A RAID PROTECTED ARRAY

(71) Applicant: INTERNATIONAL BUSINESS MACHINES CORPORATION, Armonk, NY (US)

(72) Inventors: Joseph W. Dain, Vail, AZ (US); Renan J. Ugalde Amezcua, El Salto (MX)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 159 days.

This patent is subject to a terminal disclaimer.

(21) Appl. No.: 15/438,097

(22) Filed: Feb. 21, 2017

(65) Prior Publication Data

US 2017/0161153 A1 Jun. 8, 2017

Related U.S. Application Data

(63) Continuation of application No. 14/596,938, filed on Jan. 14, 2015, now Pat. No. 9,626,115.

(51) Int. Cl.
*G06F 11/14* (2006.01)
*G06F 3/06* (2006.01)
*G06F 11/00* (2006.01)

(52) U.S. Cl.
CPC .......... *G06F 11/1451* (2013.01); *G06F 3/065* (2013.01); *G06F 3/0619* (2013.01); *G06F 3/0653* (2013.01); *G06F 3/0689* (2013.01); *G06F 11/00* (2013.01); *G06F 11/1453* (2013.01); *G06F 11/1464* (2013.01); *G06F 11/1469* (2013.01); *G06F 2201/84* (2013.01); *G06F 2201/85* (2013.01)

(58) Field of Classification Search
CPC .. G06F 11/1469; G06F 11/1446; G06F 11/00; G06F 11/14; G06F 11/1435; G06F 11/1456; G06F 11/1092; G06F 3/065; G06F 3/0689; G06F 3/0688
See application file for complete search history.

(56) References Cited

U.S. PATENT DOCUMENTS

| | | | | |
|---|---|---|---|---|
| 7,447,938 B1* | 11/2008 | Coatney | ............. | G06F 11/1084 714/6.32 |
| 7,549,027 B1* | 6/2009 | McAndrews | ....... | G06F 11/1469 707/999.202 |
| 8,200,638 B1 | 6/2012 | Zheng et al. | | |
| 8,214,406 B2 | 7/2012 | Kushwah | | |
| 8,386,850 B2 | 2/2013 | Riegel et al. | | |

(Continued)

*Primary Examiner* — Nadeem Iqbal
(74) *Attorney, Agent, or Firm* — Griffiths & Seaton PLLC

(57) ABSTRACT

Changes in a multi-RAID configuration to metadata of a source production volume in a source RAID are monitored since taking a most recent FC backup on the source production volume. The incremental copies of the metadata are stored on a target production volume in a target RAID. The source RAID is used to serve as a storage for the source production volume and also serve as a FC backup of the target production volume residing on the target RAID for creating a dual purpose for the multi-RAID configuration.

20 Claims, 6 Drawing Sheets

(56) References Cited

U.S. PATENT DOCUMENTS

| | | | |
|---|---|---|---|
| 9,043,280 B1 | 5/2015 | Patwardhan | |
| 9,189,345 B1 | 11/2015 | Khanduja et al. | |
| 9,268,647 B1 | 2/2016 | Mam et al. | |
| 9,600,375 B2* | 3/2017 | Dain | G06F 11/1453 |
| 9,626,115 B2* | 4/2017 | Dain | G06F 3/0619 |
| 2004/0243775 A1* | 12/2004 | Coulter | G06F 11/1451 |
| | | | 711/162 |
| 2005/0160243 A1* | 7/2005 | Lubbers | G06F 3/0605 |
| | | | 711/162 |
| 2007/0168690 A1* | 7/2007 | Ross | G06F 11/0712 |
| | | | 714/4.11 |
| 2013/0124798 A1* | 5/2013 | Aszmann | G06F 3/0689 |
| | | | 711/114 |
| 2014/0019421 A1 | 1/2014 | Jagadeesan | |
| 2015/0286427 A1 | 10/2015 | Akirav et al. | |

\* cited by examiner

1

THRESHOLD BASED INCREMENTAL FLASHCOPY BACKUP OF A RAID PROTECTED ARRAY

CROSS-REFERENCE TO RELATED APPLICATIONS

This Application is a Continuation of U.S. patent application Ser. No. 14/596,938, filed on Jan. 14, 2015.

BACKGROUND OF THE INVENTION

Field of the Invention

The present invention relates in general computing systems, and more particularly to, systems and methods for threshold based incremental Flashcopy (FC) backup of a redundant array of independent disks (RAID) protected array in a deduplication repository.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. Moreover, data, data files, and/or data records are also required to be stored, retained, and/or saved for various periods of time for subsequent retrieval and/or use. Efficiently storing and/or recycling the data, data files, and/or data records data is a key problem to solve, and therefore, a need exists to improve the data storage utilization and recycling.

SUMMARY OF THE INVENTION

In one embodiment, a method is provided for threshold based incremental Flashcopy (FC) backup of a redundant array of independent disks (RAID) protected array in a deduplication repository using a processor device in a computing environment. In one embodiment, by way of example only, the method comprises monitoring changes in a multi-RAID configuration to metadata of a source production volume in a source RAID since taking a most recent FC backup on the source production volume and storing incremental copies of the metadata on a target production volume in a target RAID; and using the source RAID array to serve as a storage for the source production volume and also serve as a FC backup of the target production volume residing on the target RAID for creating a dual purpose for the multi-RAID configuration.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
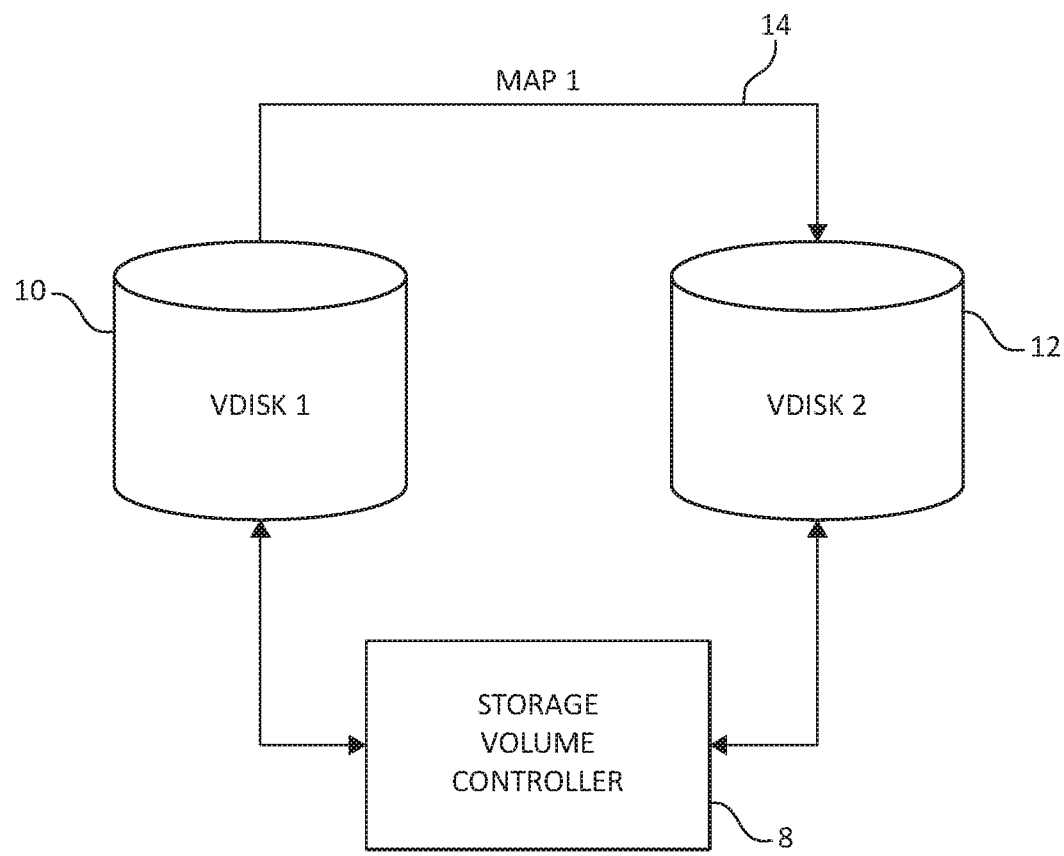
FIG. 1 is a block diagram illustrating a computing system environment having a pair of storage disks in which aspects of the present invention may be realized.

Data deduplication is a highly important and vibrant field in computing storage systems. Data deduplication refers to the reduction and/or elimination of redundant data. In data deduplication, a data object, which may be a file, a data stream, or some other form of data, is broken down into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form.

In addition to data deduplication, a FlashCopy® function may be used for creating data redundancy. (FlashCopy is a registered trademark of International Business Machines Corporation in the United States and other countries.) A FlashCopy® is a feature supported on various storage devices that allows a user and/or an automated process to make nearly instantaneous copies of entire logical volumes of data. A copy of a source disk is made on a target disk. The copies are immediately available for both read and write access. A feature of FlashCopy® like implementations is the ability to reverse the copy. That is, to populate the source disk of a FlashCopy® map with the contents of the target disk. With cascaded implementations, in which a target disk later becomes the source disk for a further FlashCopy®, this feature is complicated by the fact that the "grains" of data presented by a disk are located on a number of target/source disks "upstream" of the disk itself. This means that in order for a disk to maintain the image it is presenting, it must have access to all the disks containing these grains of data.

As mentioned, the FlashCopy® function may be used for creating data redundancy. For example, the FlashCopy® function enables an administrator to make point-in-time, full volume copies of data, with the copies immediately available for read or write access. The FlashCopy® can be used with standard backup tools that are available in the environment to create backup copies on tape. A FlashCopy® function creates a copy of a source volume on a target volume. This copy, as mentioned above, is called a point-in-time (PIT) copy. When a FlashCopy® operation is initiated, a relationship is created between a source volume and target volume. This relationship is a "mapping" of the source volume and the target volume. This mapping allows a point-in-time copy of that source volume to be copied to the associated target volume. The relationship exists between this volume pair from the time that the FlashCopy® operation is initiated until the storage unit copies all data from the source volume to the target volume, or the relationship is deleted.

FlashCopy is often used for creating recovery points that are application consistent point in time copies of the production data. These recovery points can then be used in the event of production data corruption. Because the production system is often of limited usefulness when data corruption occurs, the user frequently needs to be able to restore the production data immediately. Additionally users typically do not want to sacrifice any existing backups because restoring the production system may need to be re-triggered if mistakes are made when recovering the system. When the data is physically copied, a background process copies tracks from the source volume to the target volume. The amount of time that it takes to complete the background copy depends on various criteria, such as the amount of data being copied, the number of background copy processes that are running and any other activities that are presently occurring. The FlashCopy® function works in that the data which is being copied does not actually need to be copied instantaneously, it only needs to be copied just prior to an update causing on overwrite of any old data on the source volume. So, as data changes on the source volume, the original data is copied to the target volume before being overwritten on the source volume. This copying operation is referred to as a "copy on write" and is part of a "cleaning" in which dependency of the target volume on the source volume is removed for the grain of data copied.

Therefore, a FlashCopy® is a supported on various storage devices that allows a user or an automated process to make nearly instantaneous copies of entire logical volumes of data. A copy of a source disk is made on a target disk. The copies are immediately available for both read and write access. A feature of FlashCopy® like implementations is the ability to reverse the copy. That is, to populate the source disk of a FlashCopy® map with the contents of the target disk, typically in a restore operation.

There may be two types of point-in-time (PIT) backup processes used in data storage systems. One is called a clone and the other a snapshot. A clone is a PIT copy where the target disk will hold a complete copy of the data that was on the source disk when the PIT copy was started. When the copying of data from source to target completes, the target disk is independent of the source. Conversely, a snapshot is a PIT copy where the target only holds the changed data necessary to present the PIT copy of the source. Data is typically only copied to the target disk if it is changed on the source. The target disk is generally dependent on some of the data on the source disk in order to present the PIT copy.

One of the challenges to providing deduplication functionality includes aspects such as efficiently protecting against drive failures in a deduplication repository. A deduplication repository typically contains metadata (e.g., pointers to unique instances of chunks of customer data) and user data (unique chunks of customer data). Deduplication storage/repositories are generally built on top of redundant array of independent disks (RAID) protected storage. It is necessary to provide the proper level of protection while minimizing cost and maximizing performance. Metadata and user data may be combined on the same RAID or on a dedicated separate RAID. When combined, there may be performance implications as the metadata and user data input/output (I/O) workloads must contend for the same RAID disk resources. Having separate, dedicated RAID storage for user data and metadata generally yields the most efficient performance.

Historically, in order to provide optimal performance and protection, certain disk drives are used for metadata in a RAID 10 mirror configuration (e.g., the IBM® ProtecTIER Fibre Channel (FC) drive having 10 thousand (K) revolutions per minute (RPM) serial attached SCSI storage (SAS) or 15K RPM FC drives), and also one of the following types of drives may be used for user data depending on the deduplication algorithm and performance requirements: 7.2K RPM near line (NL)-SAS, 10K RPM SAS, 15K RPM FC. However, a deduplication algorithm (e.g., a deduplication algorithm for IBM ProtecTIER) enables it to be used with 7.2K RPM NL-SAS drives for both metadata and user data while still providing very good performance. RAID 6 is used for user data and can tolerate double drive failures, but RAID 1 is used for metadata, which can only tolerate a single drive failure at a time. The 7.2K RPM NL-SAS drives provide 25% less reliability than 10K RPM SAS or 15K RPM FC drives which makes the probability of encountering a double drive failure in the same RAID 1 array statistically significant enough to require further protection. The statistical significance of encountering a double drive failure in the same RAID 1 array pertains to encountering an entire drive failure during rebuild of a mirrored pair, and also to encountering a non-recoverable read error on a mirrored drive during rebuild. In order to reduce the probability of encountering double drive failures that result in data loss while still optimizing performance and cost, a new solution must be provided.

One such solution is the data protection scheme provided by IBM XiV®. XiV comprises numerous NL-SAS drives that have a secondary mirror copy of the data spread against all the spindles in the array. This provides very sufficient data protection and rebuild times as well as performance, but comes at the penalty of high spindle count overhead. For example, in a 240 drive system, unique data can only be put on ½ of those drives. This amount of overhead is not acceptable for a deduplication repository since one of the value propositions of deduplication is to significantly reduce the cost of storing data.

It is also impossible to create RAID 6 arrays for metadata either combined with user data or separate from user data primarily due to the IO nature of metadata being small block (4K) random read write as the parity calculation provides too much overhead. In the case of separate user data and metadata RAID 6 arrays, the drive count is still too high to be competitive. Thus, a need exists for providing a solution for metadata in a deduplication repository that balances reliability, performance, and capacity.

To address this need, in one embodiment, additional protection is provided beyond traditional RAID based disk protection by creating a dual purpose for multiple RAID configurations where each of the multiple RAID configurations service application deduplication metadata storage and also to provide a FlashCopy backup of an adjacent metadata RAID. In one embodiment, the present invention monitors changes in a multi-RAID configuration to metadata of a source production volume in a source RAID since taking a most recent FlashCopy (FC) backup on the source production volume and stores incremental copies of the metadata on a target production volume in a target RAID, and creates the incremental FC backup of the metadata periodically or if the monitored changes exceed a change rate threshold. In one embodiment, the present invention is used in deduplication integration, such as IBM® Hydra® TS772D, the TS7660 ProtecTIER® 2 AP2 appliance, as well as the TS7700D.

Also, in order to minimize the performance impact of having an additional FlashCopy (FC) backup on a RAID that is used for application metadata storage, an initial full and complete FlashCopy is taken. A change rate threshold is established to control when additional incremental flashcopy updates of the source to the target take place. Additionally, the system may periodically flush/copy the updated contents from the source to the target. This allows the system to control the amount of changed data and associated time to create an up-to-date flashcopy on the target RAID in the event of a drive failure on the source RAID.

During a drive failure on a source RAID, the present invention quickly updates the FlashCopy content on a separate array to obtain additional backup copies where only the changed grains since the last incremental flashcopy need to be updated which is controlled by periodic and threshold mechanisms. It should be noted that "quickly" is not a fixed period depending on the size of the LUN. However, it may take minutes (e.g., 5 to 10 minutes for a 2 Terabyte (TB) drive with 30% changes, which is quicker than hours) compared to hours of a regular rebuild operation. These copies may be used for further recovery in the event of additional drive failures and/or a non-recoverable read error during a traditional RAID rebuild on the source array.

It should be noted that the present invention minimizes metadata drive count and allows separate metadata and user data RAID arrays for optimal performance in a deduplication repository while still significantly improving reliability. Creating an incremental FlashCopy of the metadata on an adjacent array completes in minutes (e.g., quickly completes) when compared to hours of rebuild time (e.g., 8 hours) for a traditional array, and completes without having to deploy mirroring or RAID 5/6 technology for metadata protection. The reduction in time to obtain a consistent copy significantly reduces the probability of encountering additional drive failures during the FlashCopy update period. Also, the amount of data that needs to be copied during an incremental FlashCopy update of the metadata to an adjacent array is significantly less than the size of a volume and less than a traditional rebuild, which means that the exposure to non-recoverable read errors during a drive failure is significantly minimized. The time to obtain additional protection of metadata is controlled and kept constant through the threshold.

Thus, as will be described herein, the present invention monitors the changes to the source metadata, either periodically and/or based on a predefined threshold, by using a 1+1 metadata array. Incremental copies of the changed source metadata are stored on the target/destination RAID. Here, the data is quickly recovered from the stored incremental copies on the destination RAID upon occurrence of a drive failure.

An additional problem solved by the present invention pertains to providing an efficient recovery from a complete RAID array failure using the consistent metadata FlashCopy that resides in a separate metadata RAID and volume. This recovery needs to be performed in a manner that prevents any data loss, and does so, in an efficient way that minimizes impact to the deduplication application and the user. During a rebuild of the source RAID using traditional hot spare RAID rebuild techniques, complete failure of the remaining drives may take place and/or a non-recoverable read error may take place, both of which result in loss of that metadata volume in the deduplication repository. Loss of a metadata volume in a deduplication repository results in losing the entire repository.

Currently, there is no solution providing the ability to recover from a failed metadata array and associated volume in a deduplication repository using a consistent point in time FlashCopy of the original source volume residing on a separate array while still minimizing disk count and still using the separate array to contain a copy of the original source volume as well as be able to service metadata updates from the deduplication application.

Thus, to address this need, the present invention protects against RAID failures that would otherwise result in loss of data. After obtaining a consistent FlashCopy on an adjacent RAID, an algorithm is provided to recover against losing additional drives in the source RAID that would normally automatically result in data loss without requiring the taking of the deduplication repository offline. Thus, in one embodiment, consistent copies of the original source data, that reside on a separate volume and underlying source RAID hosting the source volume, are used in order to recover from the complete failure of the original source RAID and associated volume. This recovery is done in a manner that keeps the deduplication repository online, and prevents losing the entire deduplication repository. The advantage to this recovery operation is that it automatically recovers deduplication repository metadata in the event of a complete failure of a metadata array without consuming additional disk resources, keeps the deduplication repository online, and reverts to a preferred volume configuration. In one embodiment, the a new LUN (e.g., a new backup volume) is created using a synchronized flashcopy to restore a metadata volume associated with deduplicated data.

FIG. 1 illustrates the concept of a backup process using a storage controller 8 and two storage disks 10 and 12. The disks 10 and 12 could form part of a larger array of disks, and may form part of an enterprise storage solution. The disks 10 and 12 could be part of a storage solution relating to a commercial website, for example. If at any time a backup needs to be made of the content of vdisk1, then a FlashCopy instruction can be sent from the storage volume controller 8 to that disk 10, which defines a source disk 10 (vdisk1) and also a target disk 12 (vdisk2), which is the target of the FlashCopy. The FlashCopy instruction creates a point-in-time copy of the image of the specific vdisk, which is the source disk 10.

In the embodiment of FIG. 1, the source disk 10 of a first FlashCopy instruction is vdisk1, and the target disk 12 is vdisk2. The FlashCopy instruction starts the FlashCopy process, which creates a map 14 from the source disk 10 to the target disk 12. This map is labeled MAP 1 in the Figure. The image of vdisk1 at this specific point in time is now available on vdisk2. This creates a backup of the data on vdisk1, and also allows tests and other administration tasks to be run on the data of vdisk1, without the danger of losing any of the original data, as it is preserved on the original source disk.

When a FlashCopy is made, it creates a link between the two disks 10 and 12, as defined by the map 14. Data may now be copied across in the background, with the additional requirement that any access to vdisk2 (as the target disk 12) may immediately cause the relevant parts of the image of vdisk1 to be copied across, and also any access to vdisk1, which would result in a change to the image stored by that disk 10, and will also cause the unaltered data to be immediately copied across to the target disk 12 prior to the change being made. In this way, the vdisk2, to an outside user, stores the point in time copy of vdisk1, although data may only be physically copied across under the circumstances described above.

Figure 2:
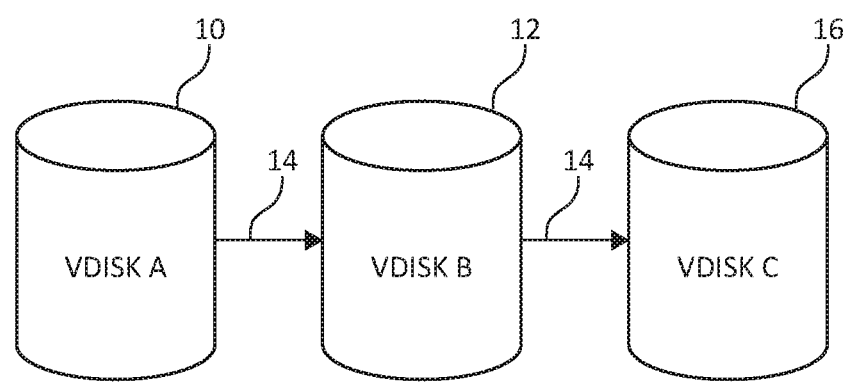
FIG. 2 is a block diagram showing an exemplary hardware structure of a FlashCopy cascade in a computer system according to the present invention in which aspects of the present invention may be realized.

A storage volume that is the target volume of a backup process such as a FlashCopy function can also be the source volume of a further backup process, thus creating a cascade of storage volumes. In FIG. 2 there is shown an example of a FlashCopy cascade of three storage volumes 10, 12 and 16, which are linked by FlashCopy maps 14. Each map 14 defines a backup process from a source volume to a target volume. Disk B is providing a backup of disk A, and disk C is also providing a backup of disk A, through disk B. The FlashCopy functions 14 linking the different storage volumes may have been started at different times, which create different point-in-time copies of the images stored by the respective storage volumes, or could have been started simultaneously.

In the FlashCopy cascade of A→B→C, where A, B and C are the disks in the cascade, as shown in FIG. 2, and the arrows (→) are the FlashCopy maps (the arrows may also represent the FlashCopy backup and/or FlashCopy maps in other Fig.'s described herein), then denoting (A, B) to be a FlashCopy mapping from disk A to disk B, the cascade has maps (A, B) and (B, C). In this implementation of the cascade, any new data write to disk A will cause a write, that is a "copy write", to disk B, as per the respective FlashCopy function, which is required to maintain the image on disk B. This writing to disk B will cause a further read, often referred to as a "clean read", of disk B followed by another copy write to disk C. In this way a single write to the first storage volume 10 in the cascade can result in a number of input/output (I/O) cleaning operations throughout the cascade.

When a cascade is created, the new maps and new storage volumes are inserted into the cascade, not added to the end of the cascade. In the cascade shown in FIG. 2, the first backup process started would be A→C. When the backup process A→B is then started, the new target storage volume B is effectively "inserted" between the existing source storage volume A and the existing target storage volume C. This "insertion" is purely a logical construction illustrating the fact that target disk C will receive data writes from disk B, rather than disk A. This is how a cascaded implementation differs from a conventional arrangement, which would have two independent maps from disk A. The storage volume controller may be operated so that the disks and maps are arranged so that clones and snapshots are separated into different dependency chains or cascades.

Figure 3:
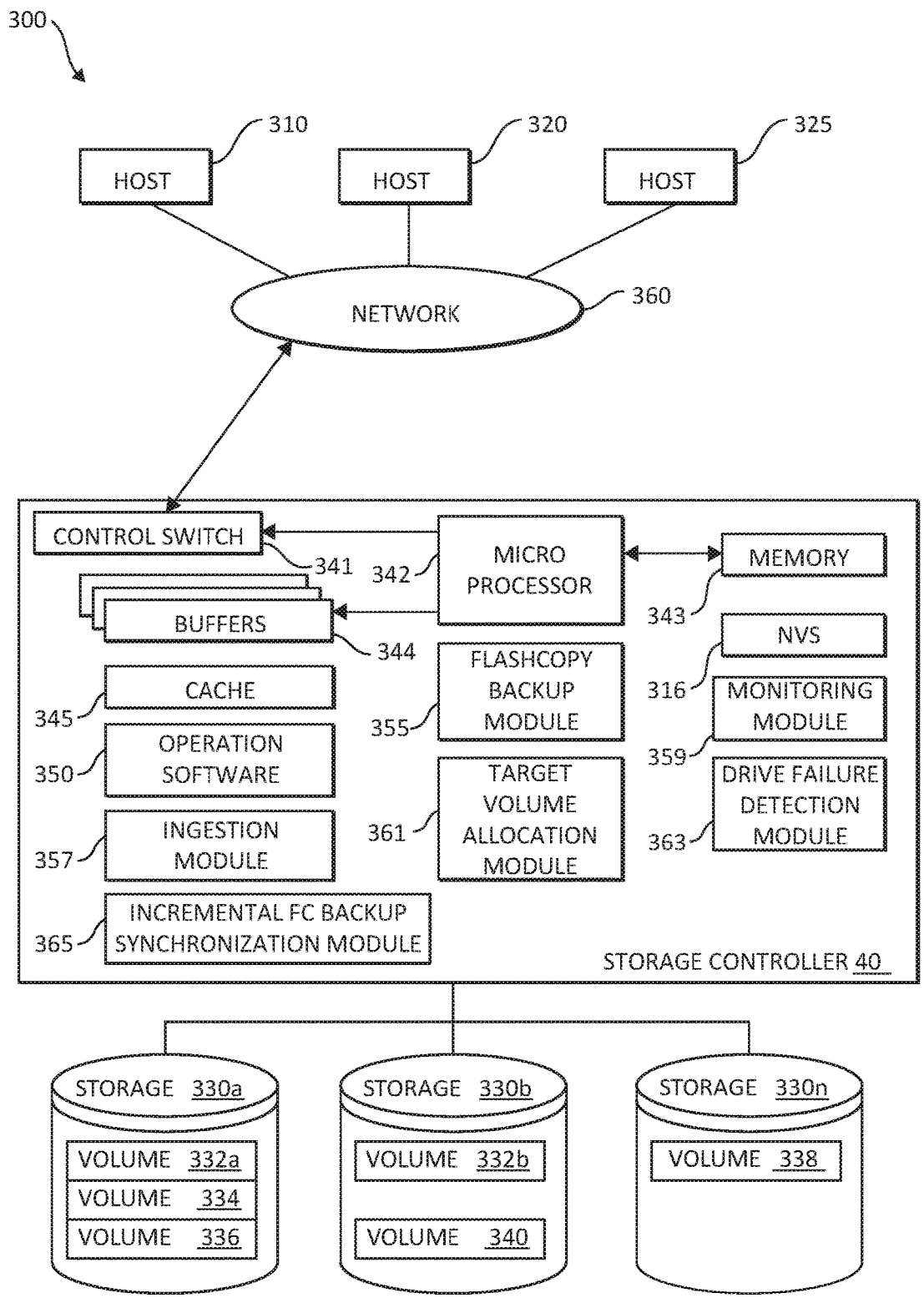
FIG. 3 is a block diagram showing an exemplary hardware structure of a data storage system in a computer system according to the present invention in which aspects of the present invention may be realized.

FIG. 3 is an exemplary block diagram 300 showing a hardware structure of a data storage system in a computer system according to the present invention. Host computers 310, 320, 325, are shown, each acting as a central processing unit for performing data processing as part of a data storage system 300. The hosts (physical or virtual devices), 310, 320, and 325 may be one or more new physical devices or logical devices to accomplish the purposes of the present invention in the data storage system 300. A Network connection 360 may be a fibre channel fabric, a fibre channel point to point link, a fibre channel over ethernet fabric or point to point link, a FICON or ESCON I/O interface, any other I/O interface type, infiniband, SAS, a wireless network, a wired network, a LAN, a WAN, heterogeneous, homogeneous, public (i.e. the Internet), private, or any combination thereof. The hosts, 310, 320, and 325 may be local or distributed among one or more locations and may be equipped with any type of fabric (or fabric channel) (not shown in FIG. 3) or network adapter 360 to the storage controller 340, such as Fibre channel, FICON, ESCON, Ethernet, fiber optic, infiniband, SAS, wireless, coaxial adapters, and/or any other type network adapter. Data storage system 300 is accordingly equipped with a suitable fabric (not shown in FIG. 3) or network adapter 360 to communicate. Data storage system 300 is depicted in FIG. 3 comprising storage controller 340 and storage 330. In one embodiment, the embodiments described herein may be applicable to a variety of types of computing architectures, such as in a virtual cluster management environment using the various embodiments as described herein.

To facilitate a clearer understanding of the methods described herein, storage controller 340 is shown in FIG. 3 as a single processing unit, including a microprocessor 342, system memory 343 and nonvolatile storage ("NVS") 316, which will be described in more detail below. It is noted that in some embodiments, storage controller 340 is comprised of multiple processing units, each with their own processor complex and system memory, and interconnected by a dedicated network within data storage system 300. Storage 330 may be comprised of one or more storage devices, such as storage arrays, which are connected to storage controller 340 by a storage network.

In some embodiments, the devices included in storage 330 may be connected in a loop architecture. Storage controller 340 manages storage 330 and facilitates the processing of write and read requests intended for storage 330. The system memory 343 of storage controller 340 stores the operation software 350, program instructions and data, which the processor 342 may access for executing functions and method steps associated with managing storage 330, and executing the steps and methods of the present invention. As shown in FIG. 3, system memory 343 may also include or be in communication with a cache 345 for storage 330, also referred to herein as a "cache memory", for buffering "write data" and "read data", which respectively refer to write/read requests and their associated data. In one embodiment, cache 345 is allocated in a device external to system memory 343, yet remains accessible by microprocessor 342 and may serve to provide additional security against data loss, in addition to carrying out the operations as described herein.

In some embodiments, cache 345 is implemented with a volatile memory and non-volatile memory and coupled to microprocessor 342 via a local bus (not shown in FIG. 3) for enhanced performance of data storage system 300. The NVS 316 included in data storage controller is accessible by microprocessor 342 and serves to provide additional support for operations and execution of the present invention as described in other figures. The NVS 316, may also be referred to as a "persistent" cache, or "cache memory" and is implemented with nonvolatile memory that may or may not utilize external power to retain data stored therein. The NVS may be stored in and with the cache 345 for any purposes suited to accomplish the objectives of the present invention. In some embodiments, a backup power source (not shown in FIG. 3), such as a battery, supplies NVS 316 with sufficient power to retain the data stored therein in case of power loss to data storage system 300. In certain embodiments, the capacity of NVS 316 is less than or equal to the total capacity of cache 345.

Storage 330 may be physically comprised of one or more storage devices, such as storage arrays. A storage array is a logical grouping of individual storage devices, such as a hard disk. In certain embodiments, storage 330 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, the storage system as shown in FIG. 3 may include a logical volume, or simply "volume," may have different kinds of allocations. Storage 330a, 330b and 330n are shown as ranks in data storage system 300, and are referred to herein as rank 330a, 330b and 330n. Ranks may be local to data storage system 300, or may be located at a physically remote location. In other words, a local storage controller may connect with a remote storage controller and manage storage at the remote location. Rank 330a is shown configured with two entire volumes, 334 and 336, as well as one partial volume 332a. Rank 330b is shown with another partial volume 332b. Thus volume 332 is allocated across ranks 330a and 330b. Rank 320n is shown as being fully allocated to volume 338—that is, rank 330n refers to the entire physical storage for volume 338. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 340 may include a FlashCopy backup module 355, an ingestion module 357, a monitoring module 359, a target volume allocation module 361, a drive failure detection module 363, and an incremental FC backup synchronization module 365. The FlashCopy backup module 355, the ingestion module 357, the monitoring module 359, the target volume allocation module 361, the drive failure detection module 363, and the incremental FC backup synchronization module 365 may be one complete module functioning simultaneously or separate modules. The FlashCopy backup module 355, the ingestion module 357, the monitoring module 359, the target volume allocation module 361, the drive failure detection module 363, and the incremental FC backup synchronization module 365 may have some internal memory (not shown) and may store unprocessed, processed, or "semi-processed" data. The FlashCopy backup module 355, the ingestion module 357, the monitoring module 359, the target volume allocation module 361, the drive failure detection module 363, and the incremental FC backup synchronization module 365 may work in conjunction with each and every component of the storage controller 340, the hosts 310, 320, 325, and other storage controllers 340 and hosts 310, 320, and 325 that may be remotely connected via the storage fabric 360. Both the FlashCopy backup module 355, the ingestion module 357, the monitoring module 359, the target volume allocation module 361, the drive failure detection module 363, and the incremental FC backup synchronization module 365 may be structurally one complete module or may be associated and/or included with other individual modules. The FlashCopy backup module 355, the ingestion module 357, the monitoring module 359, the target volume allocation module 361, the drive failure detection module 363, and the incremental FC backup synchronization module 365 may also be located in the cache 345 or other components of the storage controller 340.

The storage controller 340 includes a control switch 341 for controlling the fiber channel protocol to the host computers 310, 320, 325, a microprocessor 342 for controlling all the storage controller 340, a nonvolatile control memory 343 for storing a microprogram (operation software) 350 for controlling the operation of storage controller 340, cache 345 for temporarily storing (buffering) data, and buffers 344 for assisting the cache 345 to read and write data, a control switch 341 for controlling a protocol to control data transfer to and/or from the FlashCopy backup module 355, the ingestion module 357, the monitoring module 359, the target volume allocation module 361, the drive failure detection module 363, and the incremental FC backup synchronization module 365 in which information may be set. Multiple buffers 344 may be implemented to assist with the methods and steps as described herein.

In one embodiment, the host computers, or one or more physical or virtual devices 310, 320, 325 and the storage controller 340 are connected through a network adaptor (this could be a fibre channel) 360 as an interface i.e., via a switch called "fabric." The microprocessor 342 may control the memory 343 to store command information from the cluster host/node device (physical or virtual) 310 and information for identifying the cluster host/node device (physical or virtual) 310. The control switch 341, the buffers 344, the cache 345, the operating software 350, the microprocessor 342, memory 343, NVS 316, the FlashCopy backup module 355, the ingestion module 357, the monitoring module 359, the target volume allocation module 361, the drive failure detection module 363, and the incremental FC backup synchronization module 365 are in communication with each other and may be separate or one individual component (s). Also, several, if not all of the components, such as the operation software 350 may be included with the memory 343. Each of the components within the devices shown may be linked together and may be in communication with each other for purposes suited to the present invention.

In one embodiment, the FlashCopying provides for completion of copying the first primary volume to the second primary volume to be signaled prior to data on the first primary volume being physically copied to the second primary volume. The system may include a first secondary volume to asynchronously mirror the first primary volume, and a second secondary volume to asynchronously mirror the second primary volume. The system includes a secondary storage controller device for the first secondary volume and the second secondary volume, and a secondary host system to communicate directly with the secondary storage controller device. The system includes a primary storage controller device for the first primary volume and the second primary volume and to communicate directly with the secondary host system. The primary storage controller device is unaware of and is unable to directly communicate with the secondary storage controller device.

Responsive to receiving a first command from a primary host system specifying that the first primary volume is to be flash-copied to the second primary volume, the primary storage controller device is to verify at least a first state of the first primary volume and the second primary volume to determine whether at least the first state permits such flash-copying. Responsive to successfully verifying at least the first state, the primary storage controller device is to send a first query to the secondary host system requesting whether the first secondary volume can be flash-copied to the second secondary volume. Responsive to unsuccessfully verifying at least the first state, the primary storage controller device is to send a first response to the primary host system indicating that the first command cannot be fulfilled.

Figure 4:
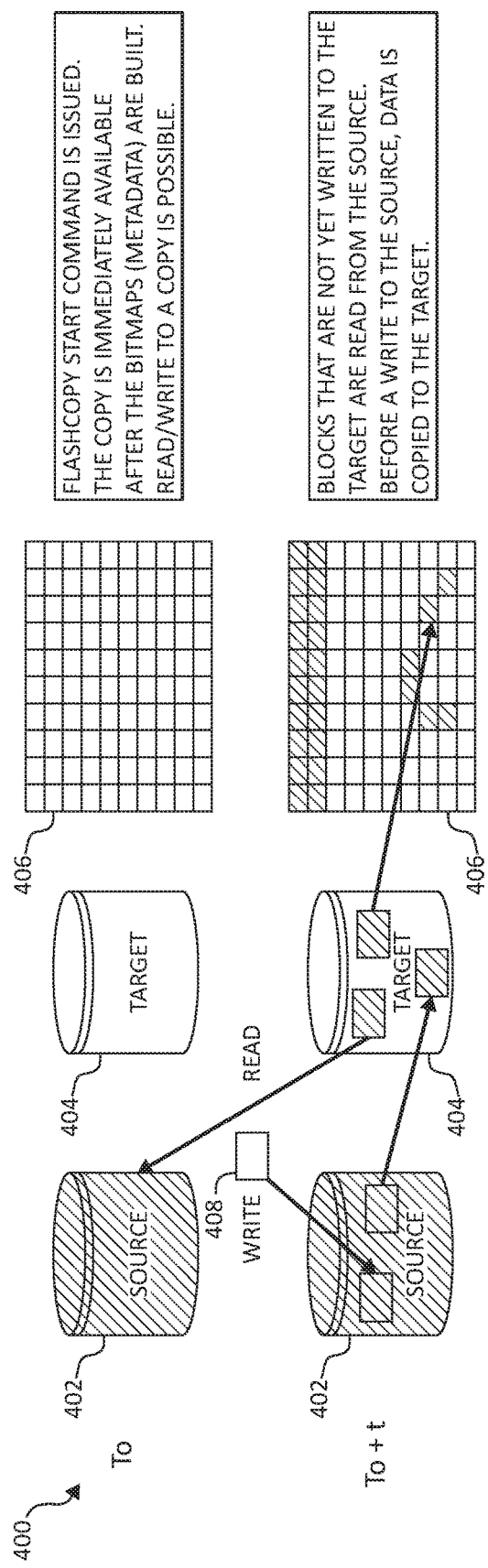
FIG. 4 is a block diagram showing an exemplary hardware structure of a FlashCopy backup operation in a computer system according to the present invention in which aspects of the present invention may be realized.

Yet, in an additional embodiment, there is a production volume P in a storage area network (SAN) volume controller (SVC), such as IBM® Storwize® SVC/V7000. FIG. 4 is a block diagram 400 showing an exemplary hardware structure of a FlashCopy backup operation in a computer system according to the present invention in which aspects of the present invention may be realized. Flashcopy backups of the production volume P (e.g., a source 402) are scheduled periodically. When a Flashcopy backup of P (e.g., the source 402) is initiated at time T0 within the SVC, a space efficient FlashCopy target volume T0 is created. This may be signified by the following notation P→T0. The arrows (→), as used herein, indicates the actual flashcopy map. The Flashcopy space-efficient (SE) feature allocates storage space on an "as-needed" basis by using space on a target volume only when it actually copies tracks (or grains) from the source volume to the target volume. Without space-efficient volumes, the Flashcopy function requires that all the space on a target volume be allocated and available even if no data is copied there. However, with space-efficient volumes, Flashcopy uses only the number of tracks (or grains) that are required to write the data that is changed during the lifetime of the Flashcopy relationship, so the allocation of space is on an "as-needed" basis. Because space-efficient Flashcopy volumes do not require a target volume that is the exact size of the source volume, the Flashcopy SE feature increases the potential for a more effective use of system storage. The space-efficiency attribute may be defined for the target volumes during the volume creation process. A space-efficient volume can be created from any extent pool that has already-created space-efficient storage. As long as the space-efficient source and target volumes have been created and are available, they can be selected when the Flashcopy relationship is created.)

The flashcopy map is a bitmap 406 of changed grains between the production volume P and the space efficient target T0. There are different Flashcopy options in the SVC. For example, as used in FIG. 4, a "no copy option" is used, which means that no background copy of all grains takes place between P (e.g., the source 406) and T0. Only grains that are changed after the snapshot bitmap is created are copied to T0. A flashcopy start command is issued. When a Flashcopy backup of the source 402 is initiated at time T0, a space efficient FlashCopy target volume 404 is created. The copy is immediately available after the bitmaps (metadata) 406 are built. The read/write to a copy is now possible. As depicted in FIG. 4, another backup T0+t is scheduled. Blocks that are not yet written to the target 404 are read from the source 402. Before a write 408 to the source is performed, the data is copied to the target 404.

Along with using the functionality of data deduplication, in one embodiment, the present invention works using the incremental FlashCopy. Such technology pertains to perform a point-in-time copy to a destination volume, as described herein. Any change on the source volume will be tracked in a bitmap for further synchronization. Once the synchronization starts it copies modified extents from the source volume towards to destination volume.

In one embodiment, the present invention chooses a metadata volume, which is going to be backed up using this procedure. In one embodiment, by way of example, a single 1+1 metadata array per repository storage drawer is used. A volume is created using up to ½ of the extents (and associated capacity) of a 1+1 array. A secondary copy of the metadata is kept on a separate 1+1 array using an incremental FlashCopy method. Initially, a full FlashCopy is started. This initial FlashCopy is going to copy all the extents from the original volume (e.g., a source production volume) to the destination (e.g., a target volume) having a point-in-time copy. Even though this will be a full copy, the FlashCopy operation runs in the background not working on the I/O path without impact on the storage performance.

After the initial copy completes, the changes on the source volume are monitored. Using two mechanisms, an incremental FlashCopy synchronization will be started: 1) If the percentage of modified extents on the source volume exceeds the threshold, and/or 2) on a periodic basis. The threshold (e.g., user defined threshold) is a parameter, which a specific percentage is set. The present invention monitors the changes on the source metadata volume using the existing FlashMap query, and if the current volume changes exceed the threshold, then an incremental FlashCopy synchronization is started. This allows for controlling the amount of data to be copied and the time for the synchronization, which minimizes the time it takes to get an up-to-date FlashCopy on the target RAID in the event of a failure in the source RAID. Controlling the time to get an up-to-date FlashCopy on the target RAID minimizes the probability of encountering additional drive failures in the source RAID during that time frame and significantly shrinks the exposure window to a level that is statistically safe. It also minimizes the probability of encountering a non-recoverable read error in the source RAID as the amount of data that must be read from the source RAID to the target FlashCopy volume is minimized, which is also proven to be statistically safe.

On the other hand, the second approach gets the Logical unit number (LUN) backed up on a periodic basis. In this way, an incremental FlashCopy synchronization is started periodically. Using this scenario, the threshold might not be necessarily met, hence the synchronization is expected to be completed faster. At this point, the present invention keeps monitoring and updating the backup copy in the separate RAID array. In case of a drive failure affecting the source volume, the RAID array starts a rebuild process, which takes hours to complete. During the rebuild period, the following steps are performed. 1) The source volume is set as read-only. This setting prevents for any incoming write operation to the source volume during the following FlashCopy synchronization. Since this is a metadata volume, the present invention (e.g., the IBM ProtecTIER) internally selects the next available volume on the system to write metadata updates. 2) An increase in FlashCopy synchronization is started. This process copies the latest changes from the last synchronization issued, either by the periodic or threshold request. Due to the combination of monitoring and this last synchronization, the system will have a latest copy faster than the regular RAID rebuild time.

Even though the synchronization completes and the source volume has a full copy, it remains in read-only mode. This avoids any changes between the copy and source. Only when the rebuild process completes, the source volume is set back to read and/or write mode and the monitoring process continues with both update approaches.

At this point, the present invention provides a mechanism to have multiple external copies (since the external copy resides on a different 1+1 array for example) and keeps the copy up to date preventing a second drive failure on the RAID array and hence losing the data. The targets are updated keeps them up-to-date.

Figure 5:
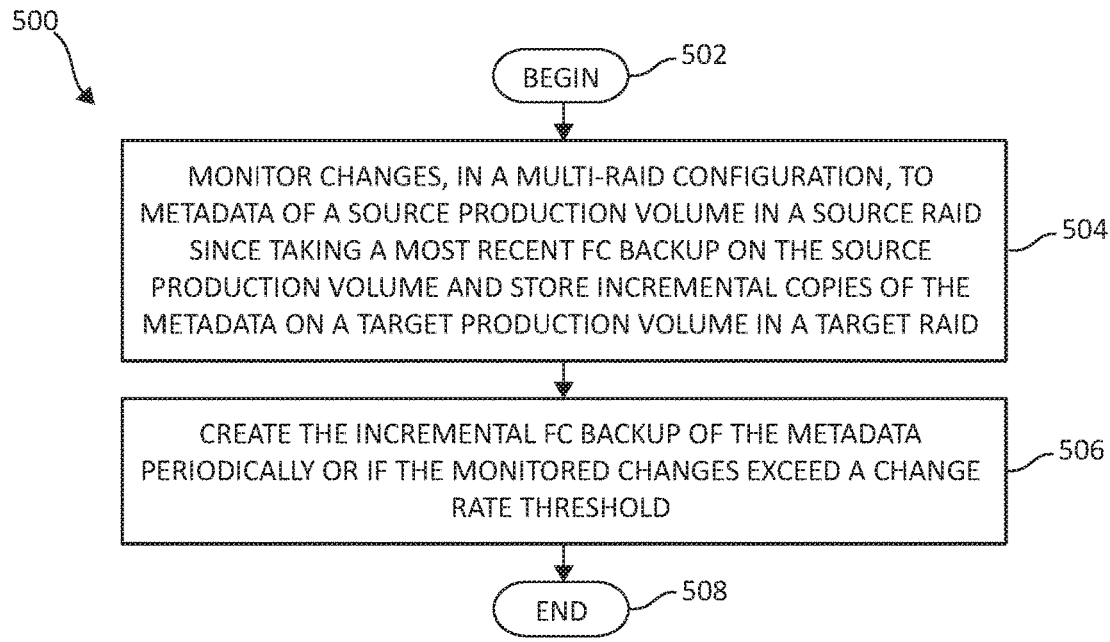
FIG. 5 is a flowchart illustrating an additional exemplary method for threshold based incremental Flashcopy (FC) backup of a redundant array of independent disks (RAID) protected array in a deduplication repository in which aspects of the present invention may be realized.

FIG. 5 is a flowchart illustrating an additional exemplary method 500 for threshold based incremental Flashcopy (FC) backup of a redundant array of independent disks (RAID) protected array in a deduplication repository in which aspects of the present invention may be realized. The method 500 begins (start 502) by monitoring changes, in a multi-RAID configuration, to metadata of a source production volume in a source RAID since the taking a most recent and/or original FC backup on the source production volume and storing incremental copies of the metadata on a target production volume in a target RAID (step 504). The method 500 periodically creates an incremental FC backup of the metadata and/or creates the incremental FC backup of the metadata periodically and/or if the monitored changes exceed a change rate threshold (step 506). The method 500 ends (step 508).

Figure 6:
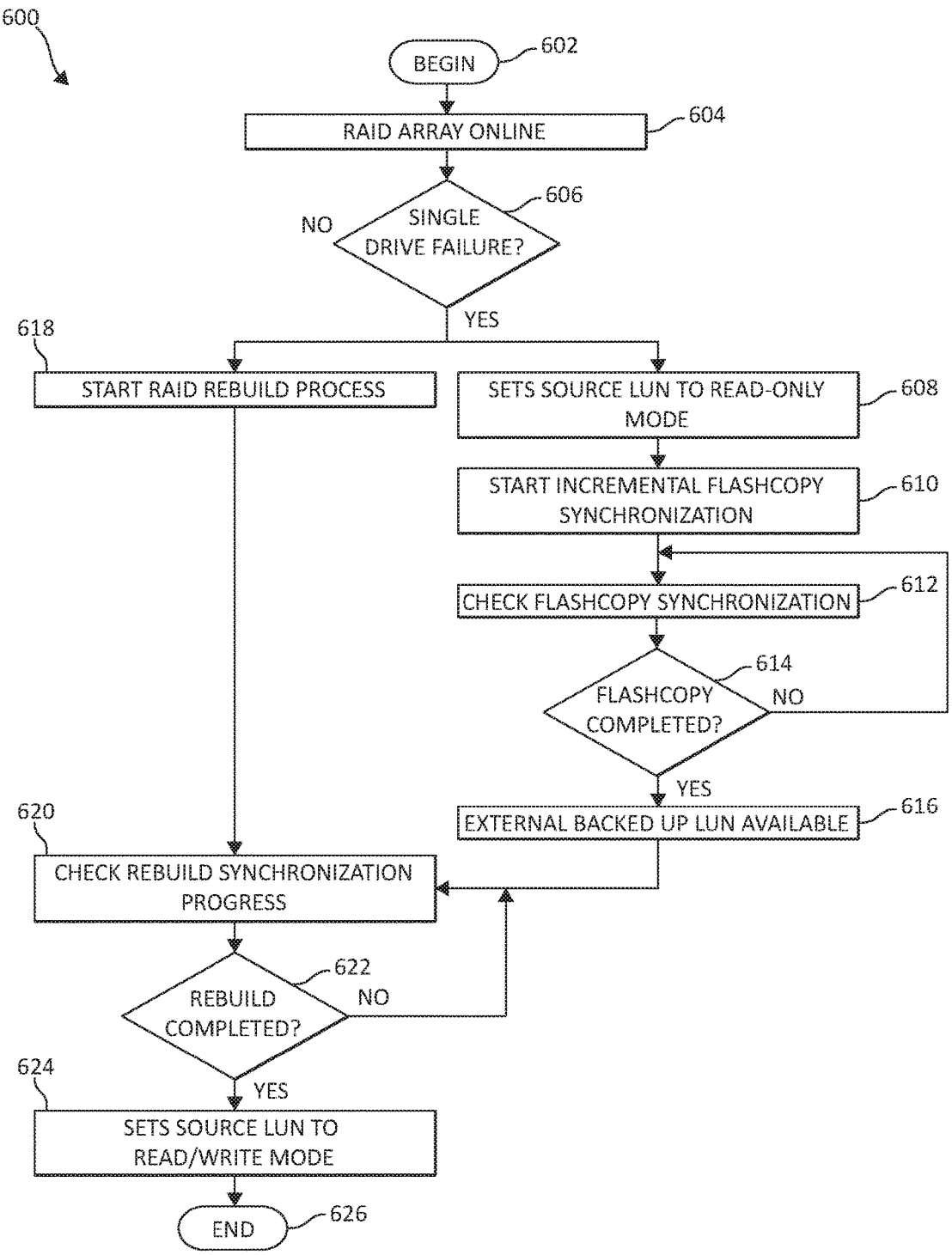
FIG. 6 is a flowchart illustrating an additional exemplary method for threshold based incremental Flashcopy (FC) backup of a redundant array of independent disks (RAID) protected array in a deduplication repository in which aspects of the present invention may be realized.

FIG. 6 is a flowchart illustrating an additional exemplary method 600 for threshold based incremental Flashcopy (FC) backup of a redundant array of independent disks (RAID) protected array in a deduplication repository. The method 600 begins (step 602) with a RAID array being online (step 604). The method 600 determines if there is a single drive failure (step 606). If no, the method 600 ends (step 626). If yes, the method 600 follows two paths. On one path, the method 600 sets a source logical unit number (LUN) to a read-only mode (step 608). The method 600 starts an incremental FC backup synchronization (step 610) and checks the Flashcopy (FC) backup synchronization (step 612). The method 600 determines if the FC backup is completed (step 614). If no, the method 600 returns to step 612). If yes, the method 600 goes to step 616 and an external backed up LUN becomes available (step 616).

From step 604, on the other path, the method 600 starts a RAID rebuild process (step 618). The method 600 checks the rebuild synchronization process (step 620). The method 600 determines if the rebuild of the RAID is completed (step 622). If no, the method 600 returns to step 620 to check the rebuild synchronization process. If yes, the method 600 sets the source LUN to a read/write mode (e.g., restores the source LUN from the read only mode to the read and/or write mode) (step 624). The method 600 ends (step 628).

As described above, the present invention performs a monitoring and backup (block-by-block) mechanism on a source volume. However, in one embodiment, the present invention does not work with file systems since the file systems work directly at the LUN level. Rather, in one embodiment, the storage system is queried to gather the latest changes of the source volume, and in case of exceeding the threshold (e.g., user defined threshold), an incremental synchronization is performed, and the latest changes of the source volume is copied. Thus, the present invention minimizes a double disk failure exposure and reacts in case of a single drive failure updating the destination copy.

In one embodiment, the present invention performs each one of: 1) using a single RAID array to serve as the storage for a production volume and also serve as a flashcopy backup of a different production volume residing on a different RAID array, 2) tracking the changed blocks between the last snapshot backup and the production volume and upon crossing a user defined threshold (e.g., change rate threshold) for changed blocks, initiate a new snapshot backup, 3) detecting a drive failure associated with a RAID array and a production volume and upon this detection marking the production volume as read only followed by initiating a flashcopy backup to a different RAID array, and 4) taking an initial full snapshot of a production volume followed by incremental snapshots in order to provide protection against RAID failure for the production RAID.

In one embodiment, a single point in time is managed by continually merging the latest changes of a production volume with the previous changes in a single flashcopy image. In one embodiment, the present invention does not keep multiple backup snapshot points-in-time, but rather, keeps one snapshot point-in-time and performs a full and consistent copy snapshot/flashcopy block-by-block from a source to target/destination in order to provide against RAID drive failure. (It should be noted that one of the problems of merely keeping multiple snapshots without a full and consistent copy of the production volume means that if the underlying RAID hosting the production virtual volume were to fail, the multiple snapshots could not be used to recover because they only contain incremental updates based on using the production volume (e.g., vdisk) as a baseline. Such snapshot protection is more generally geared towards protecting against software bugs/computer viruses, etc.). This full and consistent copy (which is also synchronized) is performed on the background with no impact on the I/O performance. Also, the present invention uses the same RAID type/underlying physical disk resources to present both an active primary volume and a snapshot backup of a different primary volume and automatically triggers an incremental snapshot/Flashcopy backup once a changed grain threshold is crossed.

In one embodiment, the present invention uses the threshold based Incremental FlashCopy backup described in FIGS. 5 and 6. The backed up volume is the point-in-time copy, which is fully synchronized with the original metadata volume within the deduplication system. In one embodiment, by way of example, the source and target metadata RAIDs are both a 1+1 array. The restore operation starts upon the occurrence of a second drive failure. During the restore operation, an array rebuild process is under way, and losing a second drive causes the array (e.g., the 1+1 array) to go down, which would normally result in data loss and in fact complete deduplication repository loss. Such is the case where the invention uses the backed up copy and keeps the deduplication system working. If a second drive failure occurs in the source RAID, the system uses the synchronized, full copy of the original source production volume (e.g., an original LUN) that was obtained using the threshold based Incremental FlashCopy backup of a RAID protected array in a deduplication system and performs the following steps: 1) set the original LUN in repair mode, 2) creates a new 1+1 array including a new LUN (restored), 3) starts a full FlashCopy synchronization from the backed up copy to just created restored LUN, 3) updates host mapping definition on the deduplication system, and issues a request to the deduplication system to update the metadata layout.

Setting the original LUN to repair mode tells the deduplication system to hold any incoming reads on this original LUN. This is a temporary state, which is cleared as soon as the LUN is restored. In one embodiment, storage system interfaces are used in order to create the array and LUN devices, besides the LUN mapping needed for the deduplication system. Creating a new, restored LUN enables the system to stay online and continues with the deduplication operations.

When a FlashCopy synchronization starts, the content of source is immediately presented on the target LUN. This happens even though there is a synchronization in progress, and both source and target volumes are available to use having the same content. New recovery routines are provided for the deduplication system, so it can keep working with the current repository and exchanges the old metadata LUN with the one newly recovered LUN. The tasks required of the deduplication system include refreshing a list of available LUNs and rescanning new multipath devices. At this point, the deduplication system runs verifications to ensure the content is consistent. Once the verifications complete, the system (e.g., the failed, original LUN is recovered using the newly created LUN) is fully recovered even though the double disk failure scenario occurs in a short period of time. If there is a failure along this process, a number of reattempts are executed for a maximum number of attempts. Exceeding these attempts results in using a backed up volume LUN instead.

As mentioned above, the present invention protects against RAID failures that would otherwise result in loss of data. In one embodiment, by way of example only, each of the following are performed. The present invention coordinates with a deduplication application to perform a handshake that allows the deduplication application to stay online while automatically recovering from a complete RAID failure by utilizing a consistent flashcopy of the original volume in the recovery process. In one embodiment, the "handshake" communicates with the deduplication application to let it know about the failure and keeping the system online during the recovering of the system. Additional RAID failures that result in losing the data on the original production volume are detected. Upon detection of the additional RAID failures, the upper level application (e.g., deduplication system software) is notified that the volume is in repair mode. In one embodiment, this results in the deduplication system to hold and incoming reads to the failed volume. In other words, the deduplication system might decide not to use the failed volume since it is on "repair" mode. Holding incoming reads means that the deduplication system may return busy and/or retry to any host issuing writes/reads to the deduplication system (i.e. backup application).

The FC backup of the volume is presented to the deduplication system by updating host mappings, and notifying the deduplication system to update the deduplication system's internal deduplication repository metadata layout. A new array is automatically created to replace the failed array. A Flashcopy synchronization is started between the backup volume and the new RAID to establish another copy of the backup volume on the new RAID. Upon completing the initialization of the new, replacement RAID and synchronization of the read only backup volume onto the new RAID, the present invention 1) presents the copy of the backup volume on the new RAID to the deduplication system by updating host mappings, and 2) performs further coordination with the deduplication application. The further coordination enables the deduplication application to detect the new backup volume and update its internal deduplication repository metadata layout to use the copy of the backup volume on the new RAID, removes the host mapping of the original backup volume (e.g., the original source volume), makes the copy of the backup volume on the new RAID read/write accessible, and/or resumes snapshot backup of the read/write volume to the backup volume.

Figure 7:
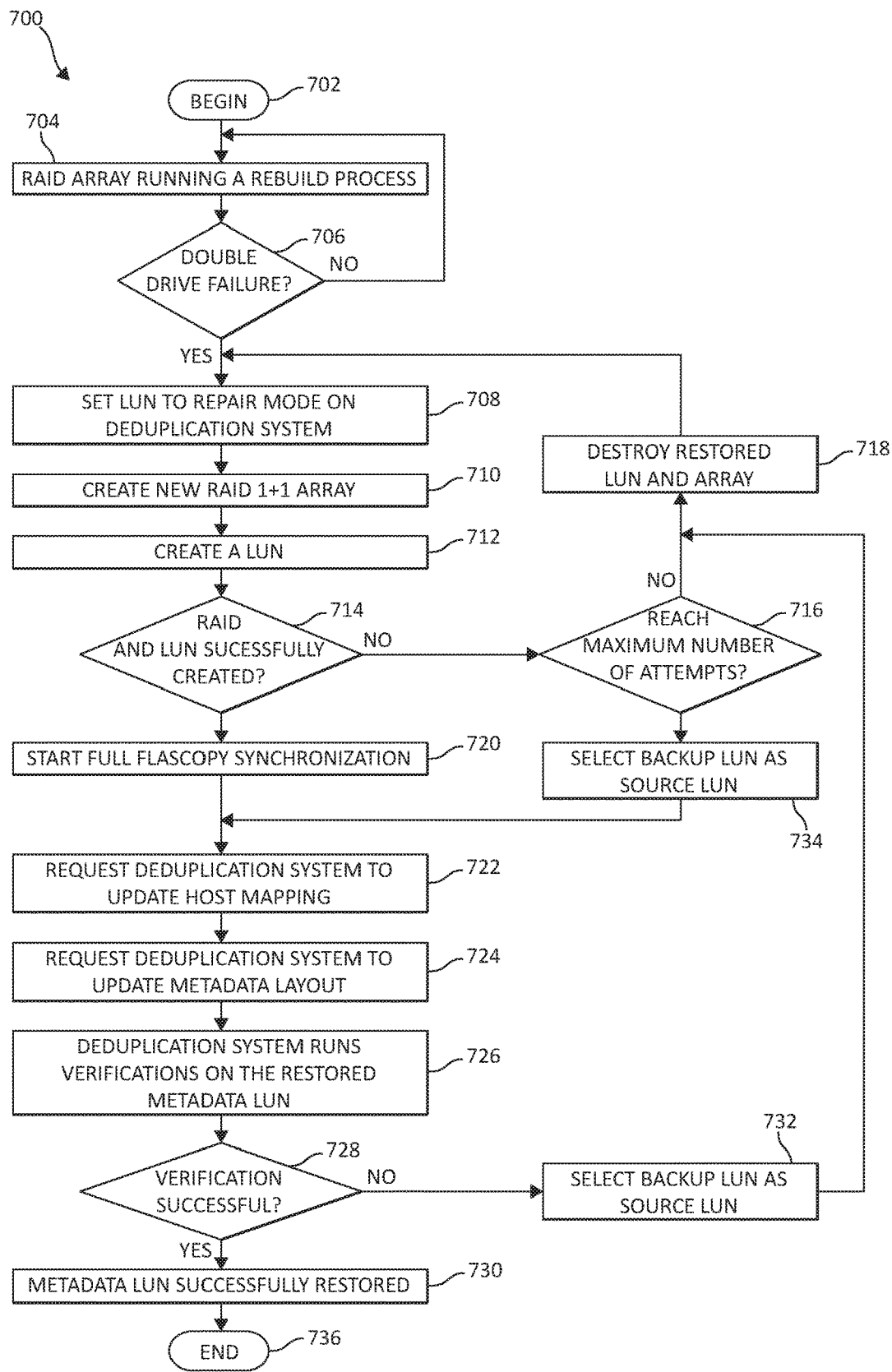
FIG. 7 is a flowchart illustrating an exemplary method for synchronized Flashcopy (FC) backup restore of a redundant array of independent disks (RAID) protected array in a deduplication repository in which aspects of the present invention may be realized.

FIG. 7 is a flowchart illustrating an additional exemplary method 700 for synchronized Flashcopy (FC) backup restore of a redundant array of independent disks (RAID) protected array in a deduplication repository. The method 700 begins (step 702) with a RAID array running a rebuild process (step 704). The method 700 detects if there is a double drive failure (e.g., double drive failure in the 1+1 metadata array) (step 706). If no, the method 700 returns to step 704. If yes, the method 700 sets an LUN to repair mode on the deduplication system (step 708). The method 700 creates a new RAID 1+1 array (step 710). The method 700 creates a new LUN (e.g., a new backup volume) (step 712). The method 700 determines if the new RAID array and the LUN are successfully created (step 714). If no, the method 700 determines if a maximum number of attempts to create the new RAID array and the LUN has been reached (step 716). From step 716, if no, the method 700 destroys the new/restored LUN and the new 1+1 RAID array (step 718). If yes (from step 716), the method 700 selects a backup LUN as a source LUN (step 734) and moves onto step 722, where the method 700 requests the deduplication system to update host mapping (step 722).

Returning to step 714, if yes, the method 700 starts a full Flashcopy synchronization operation (step 720). The method 700 then requests the deduplication system to update host mapping (step 722). The method 700 requests the deduplication system to update the metadata layout (step 724). The deduplication system runs/executes verifications on the restored metadata LUN (step 726). The method 700 determines if the verifications on the new/restored metadata LUN are successful (step 728). If no, the method 700 stops the Flashcopy synchronization operation (step 732), destroys the new/restored LUN and the new RAID array (step 718), and then sets an LUN to repair mode on the deduplication system (step 708). However, if the verifications on the restored metadata LUN are successful, the method 700 successfully restores the metadata LUN (step 730). The method 700 ends (step 736).

In an alternate embodiment, the FlashCopy backup of the original metadata volume is directly presented to the deduplication repository while the 1+1 metadata array initialization takes place. During the 1+1 metadata array initialization, the FlashCopy backup may be copied to the 1+1 metadata array, and/or the FlashCopy backup may take place after the 1+1 metadata array is fully initialized. After the 1+1 metadata array is fully initialized and the FlashCopy backup to the new 1+1 metadata array has completed, the recovered volume on the new 1+1 metadata array may be presented to the deduplication code where the code may perform an integrity check. After the integrity check completes, the FlashCopy backup host mapping is removed and the system continues to use the newly created instance in normal read/write mode. These changes occur while the system is online using the repair mode processing on the deduplication system.

In one embodiment, for threshold based incremental Flashcopy (FC) backup of a redundant array of independent disks (RAID) protected array in a deduplication repository, the present invention monitors changes in a multi-RAID configuration to metadata of a source production volume in a source RAID since taking a most recent FC backup on the source production volume and stores incremental copies of the metadata on a target production volume in a target RAID. An incremental FC backup of the metadata is created periodically and/or created if the monitored changes exceed a change rate threshold. A source RAID array is used to serve as a storage for the source production volume and also serve as a FC backup of the target production volume residing on the target RAID for creating a dual purpose for the multi-RAID configuration.

In one embodiment, the present invention detects a drive failure associated with the source RAID and the source production volume. Upon detecting a drive failure, the present invention performs at least one of and/or each one of: starting a rebuild operation of the source RAID, selecting an alternative production volume for writing metadata updates, and marking the source production volume as read only mode upon the detection of the drive failure followed by initiating a new flashcopy backup to the target RAID. Also, an incremental FC backup synchronization operation process is started. The source production volume is restored to read and/or write mode upon completion of the rebuild operation (and the monitoring operation is restarted). An initial FC backup of the source production volume is taken/captured.

In one embodiment, the present invention provides a solution for Flashcopy (FC) backup restore of a redundant array of independent disks (RAID) protected array in a deduplication repository using a processor device in a computing environment. For recovering from a complete RAID array failure in the deduplication repository, a new backup volume is created using a synchronized FC backup of the source production volume residing on an alternative RAID array. A new 1+1 RAID array is also created and associated with the new backup volume.

In one embodiment, the present invention performs a handshake for allowing a deduplication application to stay online while automatically recovering from the RAID array failure by using the synchronized FC backup during a recovery process, wherein the synchronized FC backup is a complete and consistent FC backup of the source production volume.

In one embodiment, the present invention performs at least one of and/or each one of: detecting RAID failures that result in a loss of data on the source production volume, and setting the source production volume in repair mode upon detecting the failure.

In one embodiment, the present invention creates a new metadata RAID array to automatically replace the failed metadata array.

In one embodiment, the present invention starts an FC backup synchronization between the backup volume and the new metadata RAID array to establish a copy of the backup volume on the new metadata RAID array.

In one embodiment, the present invention initializes the new metadata RAID array and synchronizes the backup volume onto the new metadata RAID array, wherein completion of the initialization and the synchronization presents the copy of the backup volume on the new metadata RAID array to the deduplication system by updating host mappings.

In one embodiment, the present invention performs each one of: enabling the deduplication application to detect the backup volume while updating a metadata layout of the deduplication repository for using the copy of the backup volume on the new metadata RAID array, removing the host mapping of the source production volume, and making the copy of the backup volume on the new metadata RAID array as a read and write mode.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for threshold based incremental Flashcopy (FC) backup of a redundant array of independent disks (RAID) protected array in a deduplication repository by a processor device in a computing environment, the method comprising:

monitoring changes in a multi-RAID configuration to metadata of a source production volume in a source RAID since taking a most recent FC backup on the source production volume and storing incremental copies of the metadata on a target production volume in a target RAID; and using the source RAID array to serve as a storage for the source production volume and also serve as a FC backup of the target production volume residing on the target RAID for creating a dual purpose for the multi-RAID configuration.

2. The method of claim 1, further including creating the incremental FC backup of the metadata periodically or if the monitored changes exceed a change rate threshold.

3. The method of claim 2, further including performing at least one of:

detecting a drive failure associated with the source RAID and the source production volume, and using a consistent FC backup from original source data from the source production volume stored on an alternative RAID and alternative storage volume to recover from a failure of the source RAID and the source production volume.

4. The method of claim 3, further including, upon detecting a drive failure, performing each one of:

marking the source production volume as read only mode upon the detection of the drive failure followed by initiating a new flashcopy backup to the target RAID, and selecting an alternative production volume for writing metadata updates.

5. The method of claim 4, further including starting an incremental FC backup synchronization.

6. The method of claim 5, further including restoring the source production volume to read and write mode upon completion of the rebuild operation and restarting the monitoring.

7. The method of claim 1, further including taking an initial FC backup of the source production volume.

8. A system for threshold based incremental Flashcopy (FC) backup of a redundant array of independent disks (RAID) protected array in a deduplication repository in a computing environment, the system comprising:

at least one processor device operable in the computing environment, wherein processor device:

monitors changes in a multi-RAID configuration to metadata of a source production volume in a source RAID since taking a most recent FC backup on the source production volume and storing incremental copies of the metadata on a target production volume in a target RAID, and uses the source RAID array to serve as a storage for the source production volume and also serve as a FC backup of the target production volume residing on the target RAID for creating a dual purpose for the multi-RAID configuration.

9. The system of claim 8, wherein the at least one processor device creates the incremental FC backup of the metadata periodically or if the monitored changes exceed a change rate threshold.

10. The system of claim 9, wherein the at least one processor device performs at least one of:

detecting a drive failure associated with the source RAID and the source production volume, and using a consistent FC backup from original source data from the source production volume stored on an alternative RAID and alternative storage volume to recover from a failure of the source RAID and the source production volume.

11. The system of claim 10, wherein the at least one processor device, upon detecting a drive failure, performs each one of:
  marking the source production volume as read only mode upon the detection of the drive failure followed by initiating a new flashcopy backup to the target RAID, and
  selecting an alternative production volume for writing metadata updates.

12. The system of claim 11, wherein the at least one processor device starts an incremental FC backup synchronization.

13. The system of claim 12, wherein the at least one processor device restores the source production volume to read and write mode upon completion of the rebuild operation and restarting the monitoring.

14. The system of claim 8, wherein the at least one processor device takes an initial FC backup of the source production volume.

15. A computer program product for efficient repository ingestion of a target volume without breaking a Flashcopy chain in a computing environment by a processor device, the computer program product comprising a non-transitory computer-readable storage medium having computer-readable program code portions stored therein, the computer-readable program code portions comprising:
  an executable portion that monitors changes in a multi-RAID configuration to metadata of a source production volume in a source RAID since taking a most recent FC backup on the source production volume and storing incremental copies of the metadata on a target production volume in a target RAID; and
  an executable portion that uses the source RAID array to serve as a storage for the source production volume and also serve as a FC backup of the target production volume residing on the target RAID for creating a dual purpose for the multi-RAID configuration.

16. The computer program product of claim 15, further including an executable portion that the incremental FC backup of the metadata periodically or if the monitored changes exceed a change rate threshold.

17. The computer program product of claim 16, further including an executable portion that performs at least one of:
  detecting a drive failure associated with the source RAID and the source production volume, and
  using a consistent FC backup from original source data from the source production volume stored on an alternative RAID and alternative storage volume to recover from a failure of the source RAID and the source production volume.

18. The computer program product of claim 17, further including an executable portion that, upon detecting a drive failure, performs each one of:
  marking the source production volume as read only mode upon the detection of the drive failure followed by initiating a new flashcopy backup to the target RAID,
  selecting an alternative production volume for writing metadata updates, and
  starts an incremental FC backup synchronization.

19. The computer program product of claim 18, further including an executable portion that restores the source production volume to read and write mode upon completion of the rebuild operation and restarting the monitoring.

20. The computer program product of claim 15, further including an executable portion that takes an initial FC backup of the source production volume.

* * * * *